United States Patent
Ramesh et al.

(10) Patent No.: US 9,311,357 B2
(45) Date of Patent: Apr. 12, 2016

(54) GENERATING REPORTS BASED ON MATERIALIZED VIEW

(71) Applicant: TATA CONSULTANCY SERVICES LIMITED, Mumbai, Maharashtra (IN)

(72) Inventors: Rajini Ramesh, Chennai (IN); Madhavi Garlapati, Chennai (IN); Mutharasi Thenmani, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 188 days.

(21) Appl. No.: 13/840,899

(22) Filed: Mar. 15, 2013

(65) Prior Publication Data

US 2013/0332487 A1 Dec. 12, 2013

(30) Foreign Application Priority Data

Jun. 6, 2012 (IN) .......................... 1665/MUM/2012

(51) Int. Cl.
*G06F 7/00* (2006.01)
*G06F 17/30* (2006.01)

(52) U.S. Cl.
CPC .... *G06F 17/30477* (2013.01); *G06F 17/30383* (2013.01); *G06F 17/30457* (2013.01)

(58) Field of Classification Search
CPC ...................... G06F 17/30457; G06F 17/30383
USPC ........................................................ 707/717
See application file for complete search history.

(56) References Cited

U.S. PATENT DOCUMENTS

| 7,158,994 | B1 | 1/2007 | Smith et al. |
| 7,516,161 | B1 * | 4/2009 | Flam |
| 7,774,354 | B2 | 8/2010 | Grundler et al. |
| 7,844,587 | B2 | 11/2010 | Blakeley et al. |
| 7,844,600 | B2 * | 11/2010 | Hu et al. ........................ 707/717 |
| 7,895,191 | B2 | 2/2011 | Colossi et al. |
| 2003/0130905 | A1 * | 7/2003 | Foster et al. .................... 705/26 |
| 2005/0004896 | A1 * | 1/2005 | Cseri et al. ....................... 707/3 |
| 2005/0262059 | A1 * | 11/2005 | White .............................. 707/3 |
| 2006/0155689 | A1 * | 7/2006 | Blakeley et al. ................. 707/3 |
| 2006/0242132 | A1 * | 10/2006 | Smith .............................. 707/3 |
| 2009/0037489 | A1 * | 2/2009 | Grundler et al. ............. 707/201 |
| 2010/0114885 | A1 * | 5/2010 | Bowers et al. ............... 707/736 |
| 2010/0161555 | A1 * | 6/2010 | Nica et al. .................... 707/624 |

OTHER PUBLICATIONS

EP Search Report dated Sep. 16, 2013 for EP 13159301, 2 pages.
Kuno, et al. "Using object-oriented principles to optimize update propagation to materialized views", Data Engineering, IEEE Comput. Soc. US, Feb. 26, 1996, pp. 310-317.
Segev, et al. "Optimal update policies for distributed materialized views", Management Science, Institute of Management Science, Providence, RI, US, vol. 37, No. 7, Jun. 1, 1991, pp. 851-870.

* cited by examiner

*Primary Examiner* — Charles Lu
(74) *Attorney, Agent, or Firm* — Lee & Hayes, PLLC (57) ABSTRACT

Systems and methods for generating a report for a resource are described. The report is generated from databases comprising data sets related to a plurality of resources. An example method includes dynamic generation of a first query upon selection of at least one attribute by a user. The first query includes instructions for being performed on the data sets. The method further includes determining that the first query is stored in a table schema. The table schema is associated with a first trigger. The method also includes invoking the first trigger based on the determining. The first trigger is configured to execute the first query to generate a materialized view upon execution of the first query. The method may include generating the report by executing a second query on the materialized view. The second query may be created based on materialized view data.

11 Claims, 3 Drawing Sheets

GENERATING REPORTS BASED ON MATERIALIZED VIEW

TECHNICAL FIELD

The present subject matter relates, in general, to report generation, and in particular, to report generation based on a materialized view.

BACKGROUND

Conventionally, reporting tools are designed to provide summaries or analyses of detailed day-to-day activities of an organization. The conventional reporting tools generate human-readable reports from various data sources of the organization. Examples of reports provided by the conventional reporting tools may include bank teller end-of-day window balancing reports, daily account audits and adjustments, daily production records, and daily incidents resolved by a helpdesk. These reports are designed to provide details that are essential to monitoring, managing and supporting the day-to-day activities of the organization.

Generally, the conventional reporting tools extract information from a single source, such as a database storing various types of information related to the organization. The conventional reporting tools may further facilitate users in selecting information as per their requirement. For example, the conventional reporting tools may allow users to submit queries for viewing the information they want to view. The users may need to form queries and run the queries on the data sources every time they would like to view specific information.

SUMMARY

This summary is provided to introduce concepts related to report generation on a materialized view, which is further described below in the detailed description. This summary is neither intended to identify essential features of the claimed subject matter nor is it intended for use in determining or limiting the scope of the claimed subject matter.

In an embodiment, method(s) and system(s) for generating a report on a materialized view is described herein. In an implementation, the method may include generating a first query based on selection of at least one attribute from a plurality of attributes of a resource, the resource being associated with a metadata driven framework. The plurality of attributes may correspond to a particular instance of the resource. The method may further include determining whether the first query is stored in a table schema. The table schema may be associated with a first trigger. The method may also include invoking the first trigger upon storage of the first query in the table schema. The first trigger may be configured to execute the first query to generate a materialized view based on an output of the first query. The materialized view may be a database object that may contain result of the first query. Additionally, the method may include executing a second query on the materialized view for generating the report. The second query may be generated based on materialized view data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Reporting tools are typically used to provide information related to an organization, thereby helping a user in making business related decisions. Information related to various departments of the organization may be stored in a database associated with the organization. Further, conventional reporting tools are configured to extract data from the database based on user selection. To do so, a user may submit a query, such as a structured query language (SQL) query, related to the information of interest to the reporting tool. For example, the user may want to see performance related data of a sales team of the organization. The user may accordingly submit the query and the conventional reporting tool may retrieve information related to the sales team from the database of the organization.

Similarly, every time the user needs some information from the database; the user may be required to submit a new query. This may be inconvenient and time consuming for the user. Moreover, when the database contains a large amount of data, the query submitted against the database can take a long time to execute and provide a result set.

In a scenario, the database may include metadata that describes structural components of various tables in the database and their elements. For example, metadata about an element may include data types, name of data, data size, and other characteristics about that element. The metadata may also provide information about the tables stored in the database, such as length of fields, number of columns, where the tables are located, and other pertinent information. Further, the database may derive data from various applications, such as a help desk application, a program and project management application, and a test management application, which may use different data structures. Hence, the database may also store the metadata of the data structures and the business information to enable changes in the structures.

Further, as the structure of the business information may be defined on a need basis, the data corresponding to the various structures may be stored as partitioned tables in the database. Query on these structures may be created by a query builder by joining one or more related resources. Such a joined query may result in increased execution time. In the above scenario, the user may need to submit complex queries, such as for defining filters on a report that is generated by the conventional reporting tools and for performing a join function on multiple tables of the database. Execution of the complex queries on the database containing metadata, as mentioned in the above examples, may be time consuming. Accordingly, the conventional reporting tools may be slow while generating operational reports on the metadata.

Additionally, the conventional reporting tools generally provide static information. Static information may refer to content that does not get updated regularly or without active intervention from a user. In an example, the report generated by the conventional reporting tools may be based on execution of queries on the database by a user, such as an administrator. The administrator may need to execute the queries on the database at regular intervals to retrieve updated data from the database. In said example, the conventional reporting tools may render the report based on the content retrieved from the database as and when the queries are executed by the administrator. However, as the administrator may not be able to execute the queries at regular intervals, the conventional reporting tools may tend to render older versions of the information and are therefore incapable of providing correct reports in real-time that may be in sync with the information stored in the database.

In another example, the data in the database may get updated after the administrator has executed the query. This may result in a report that may be based on the data retrieved when the query was executed and therefore the results of the query may not be up-to-date in accordance with the database. Accordingly, the conventional reporting tools may be dependant on execution of the queries by a user to provide a report that is updated and provides real-time information.

Further, the users may need summaries, such as conditional aggregates, for getting different levels of granularity of the information stored within the database. The users may have to execute multiple queries on the database to obtain such summaries. Accordingly, multiple result sets are obtained in respect to these multiple queries. These multiple result sets may have to be merged to render a single report. However, running multiple queries on the database and merging the multiple result sets may be a time consuming task and hence, inconvenient for the users.

The present subject matter discloses a system and a method for generating a report in a metadata driven framework. The system and method may facilitate generation of the report based on a materialized view of a database in the metadata driven framework. It will be evident to a person skilled in the art that a view may refer to a result set of a query that may be accessible as a virtual table. When there is any change in the database, the view may get changed in subsequent invocations, i.e., when the query is run again. Further, the materialized view may refer to a database object, such as a summary table, that may include results of a query in the form of a table that is updated whenever any change is detected in the database. The materialized view may provide a static snapshot of data and may include data from remote sources. For example, the materialized view may be a local copy of data located remotely, or may be a subset of rows and/or columns of a table or join result, or may be a summary based on aggregation of a table's data.

The database may be configured to store information about various resources associated with the metadata driven framework. For example, the database may include attributes about various resources, connections between various resources, and the like. The resource, in the present subject matter, may be an entity, such as an organization, a business unit, an individual, or a product, that may be associated with the metadata driven framework and for which data may be retrieved from the database.

In an implementation, the present subject matter may facilitate generation of a first query based on at least one attribute from a plurality of attributes of a resource associated with the metadata driven framework. The resource may be selected by the user. Further, the first query may include instructions for retrieving attributes of the resource at a particular instance from the database.

The first query may then be stored in a table schema. In an example, the table schema may be a reports table that may be configured to record various queries therein. Further, the table schema may be associated with a first trigger. A trigger may be understood as a program code that is automatically executed in response to occurrence of certain events on a particular data set, such as the table schema and the database. Accordingly, when the first query is stored in the table schema, the first trigger may be invoked to execute the first query and provide a materialized view. As mentioned earlier, the materialized view may include results of the first query.

In an implementation, the first query may be executed on a source data set of the database. The source data set may include information, such as attribute, connections with other resources and conditions for connections, about the resources associated with the metadata driven framework. In an example, the source data set may be a resource data table.

In an implementation, on generation of the materialized view, the source data set may be associated with a second trigger that may be configured to automatically detect any modifications taking place in the source data set. In case any modification is detected, the second trigger may update the materialized view to synchronize the materialized view with the latest information stored in the source data set. In another implementation, the present subject matter facilitates the user to generate reports, such as based on summaries and aggregates, from the materialized view. The system may facilitate creation of a second query that may be executed on the materialized view to obtain summaries. The second query may also be stored in the table schema.

In said implementation, the aggregates may be calculated using a java-based template engine, such as Velocity that may enable use of a template language to reference objects defined in Java code. The template engine may be integrated in the system of the present subject matter for generation of reports. It will be understood that the template engine may also be used as a standalone utility for generating source code and reports. Further, the second query, when executed on the materialized view, produces the data that is rendered as a report, may be configured to obtain a row level aggregate. Aggregates such as conditional counts and row level aggregates are calculated on the result set obtained from executing the second query using velocity functions.

Further, the present subject matter may enable the user to define filters on the materialized view. According to an implementation, the attributes of the resources may be selected as the filters. In addition, the report may be generated by defining run-time parameters on the materialized view.

In another implementation, when the first query is executed, the results of the first query may, in addition or alternatively, be stored in a cache table, such as a snapshot table based on the user's preference for snap shot or materialized view. The results in the snapshot table may be associated with an expiration time. For example, when the information or content of the source data set changes, the information in the snapshot table expires. Accordingly, the snapshot table may be updated when a report is executed and a check is made on the expiry time of the report whose data is stored in the cache table. Updation of the information within the snapshot table may be understood as the information being expired, deleted, and then re inserted into the snapshot table.

Thus, in accordance with the present subject matter, a reporting tool is disclosed for generating the report on the materialized view of the database containing metadata. The reporting tool may include executable instructions that may be designed to facilitate filtering of data, instructions for combining data from different data sources, instructions for updating join structures and relationships in report data, and instructions including logic to support a more complex internal data model.

The reports generated by the reporting tool of the present subject matter may facilitate dynamically updating the reports when any change is detected in the source data set. As mentioned earlier, the second trigger may update the materialized view with respect to the source data set. The triggers, namely the first trigger and the second trigger may facilitate in reducing manual intervention by the user. In addition, the present subject matter may facilitate the user to select a format for the reports, such as a pivot report and a drill down report. Further, the user may also select to define a filter, a chart, a formula, and the like on the reports. Accordingly, the present subject matter facilitates in generating reports from a single source, such as the materialized view, that contains the relevant and updated data from the source data set. The systems and methods can thus quickly generate reports that are dynamic, timely, customized to user requirements and ensure accuracy with minimal user intervention.

These and other advantages of the present subject matter would be described in greater detail in conjunction with the following figures. While aspects of described systems and methods for generating a report on a materialized view can be implemented in any number of different computing systems, environments, and/or configurations, the embodiments are described in the context of the following exemplary system(s).

Figure 1:
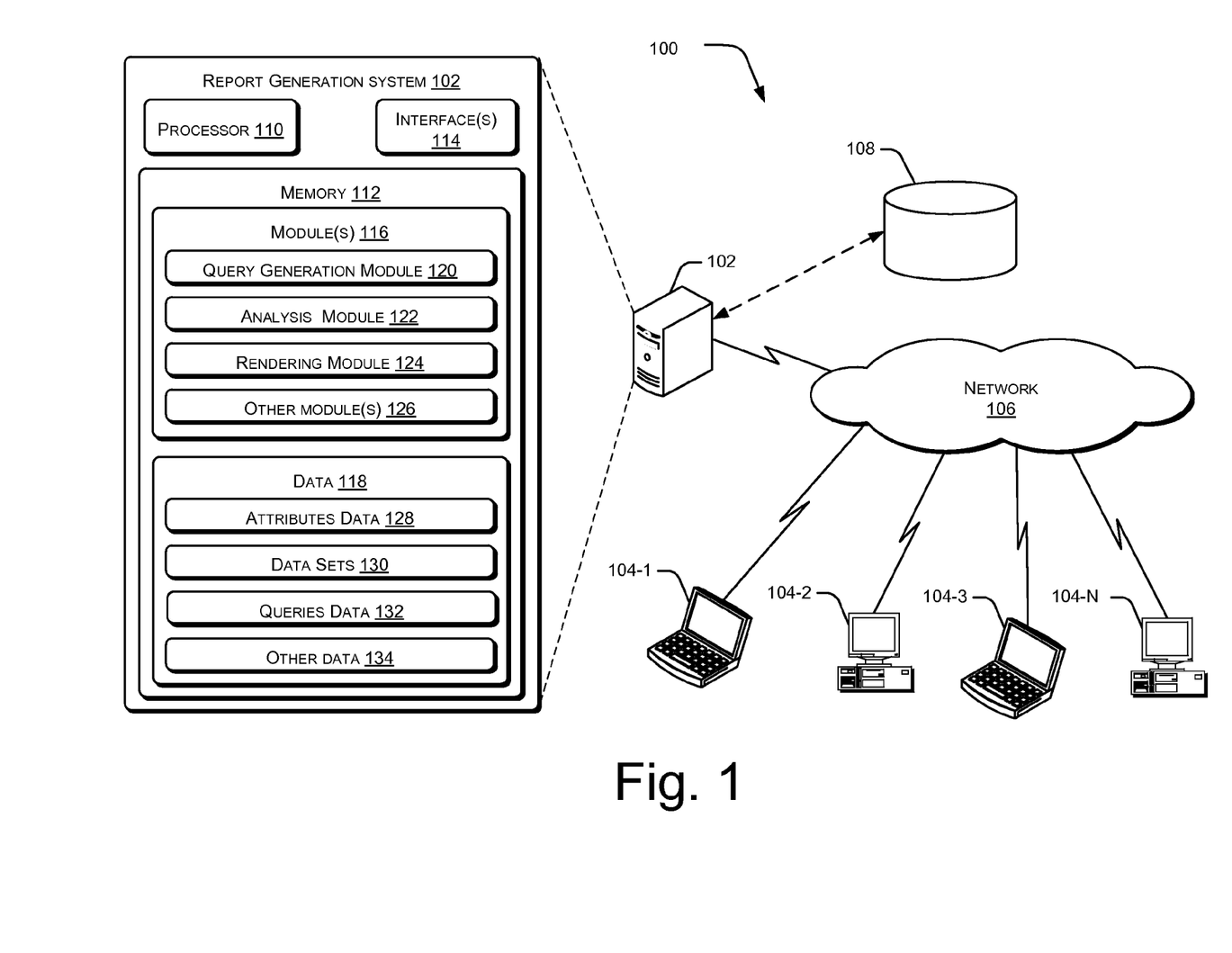
FIG. 1 illustrates a network environment implementation of a report generation system, in accordance with an embodiment of the present subject matter.

FIG. 1 illustrates a network environment 100 implementing a report generation system 102, in accordance with an embodiment of the present subject matter. In said embodiment, the network environment 100 includes the report generation system 102 configured to generate reports in a metadata driven framework. In one implementation, the network environment 100 may be a company network, including thousands of office personal computers, laptops, various servers, such as blade servers, and other computing devices. Examples of a company may include an information technology (IT) company, a product manufacturing company, a human resource (HR) company, a telecommunication company, or other large conglomerates. It will also be appreciated by a person skilled in the art that the company may be any company involved in any line of business. In another implementation, the network environment 100 may be a smaller private network. In yet another implementation, the network environment 100 may be a public network, such a public cloud.

The report generation system 102 may be implemented in a variety of computing systems, such as a laptop computer, a desktop computer, a notebook, a workstation, a mainframe computer, a server, a network server, and the like. In one implementation, the report generation system 102 may be included within an existing information technology infrastructure or a database management structure. Further, it will be understood that the report generation system 102 may be connected to a plurality of user devices 104-1, 104-2, 104-3, . . . , 104-N, collectively referred to as the user devices 104 and individually referred to as a user device 104. The user device 104 may include, but is not limited to, a desktop computer, a portable computer, a mobile phone, a handheld device, and a workstation. The user devices 104 may be used by users, such as database analysts, programmers, developers, data architects, software architects, module leaders, projects leaders, database administrator (DBA), stakeholders, and the like.

As shown in the figure, the user devices 104 are communicatively coupled to the report generation system 102 over a network 106 through one or more communication links for facilitating one or more end users to access and operate the report generation system 102. In one implementation, the network 106 may be a wireless network, a wired network, or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

In an implementation, the report generation system 102 may be coupled to a database 108. Although not shown in the figure, it will be understood that the database 108 may also be connected to the network 106 or any other network in the network environment 100. In an implementation, the database 108 may include data about an organization, such as different departments of the organization that may be supported by the metadata driven framework. In an implementation, the database 108 may be provided as a metadata driven relational database and may store data in various formats, such as relational tables, object oriented relational tables, indexed tables. Further, it will be understood that the database 108 may be provided as one or more operational databases.

In an implementation, the report generation system 102 includes a processor(s) 110 coupled to a memory 112. The report generation system 102 further includes interface(s) 114, for example, to render the report, based on a materialized view of the database 108, on the user devices 104. Further, the interface(s) 114 may include a variety of software and hardware interfaces, for example, interfaces for peripheral device(s), such as a keyboard, a mouse, an external memory, and a printer. Additionally, the interface(s) 114 may enable the report generation system 102 to communicate with other devices, such as web servers and external repositories. The interface(s) 114 may also facilitate multiple communications within a wide variety of networks and protocol types, including wired networks, for example, LAN, cable, etc., and wireless networks, such as WLAN, cellular, or satellite. For the purpose, the interface(s) 114 may include one or more ports.

The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 may be configured to fetch and execute computer-readable instructions stored in the memory 112.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 112 includes module(s) 116 and data 118.

The module(s) 116 include, for example, a query generation module 120, an analysis module 122, a rendering module 124, and other module(s) 126. The other module(s) 126 may include programs or coded instructions that supplement applications or functions performed by the report generation system 102.

The data 118 may include attributes data 128, data sets 130, queries data 132, and other data 134. The other data 134, amongst other things, may serve as a repository for storing data that is processed, received, or generated as a result of the execution of one or more modules in the module(s) 116.

Although the data 118 is shown internal to the report generation system 102, it may be understood that the data 118 can reside in an external repository (not shown in the figure), which may be coupled to the report generation system 102. The report generation system 102 may communicate with the external repository through the interface(s) 114 to obtain information from the data 118.

As mentioned herein, the present subject matter discloses systems and methods for generation of the report in the metadata driven framework. The report may be generated on a materialized view of a part of the data present in the database 108. As mentioned above, it will be evident to a person skilled in the art that a view is a result set of a query that may be accessible as a virtual table. When any change takes place in the data of the database, the view gets changed in subsequent invocations, i.e., when the query is run again. Further, the materialized view refers to a database object, such as a summary table, that may include results of a query in the form of a table that is updated whenever any change is detected in the database. Further, the materialized view may be a local copy of the data that may be located remotely, such as in a remote database. The materialized view, in the present subject matter, may include information, such as attributes of a particular resource from the one or more resources of the metadata driven framework and at a particular instance. The present subject matter further facilitates the user to define the query by selecting one or more resources. Further, queries may also be executed on the materialized view for generation of the report.

According to an implementation, the query generation module 120 may be configured to identify at least one attribute from a plurality of attributes associated with a resource of the metadata driven framework. The resource, in the present implementation, may be an entity associated with the metadata driven framework, for which data may be retrieved from the database. The plurality of attributes may be associated with a particular instance of the resource. To identify the at least one attribute, the report generation system 102 may facilitate a user to select one or more resources of interest through the user device 104. The resources of interest selected by the user may be referred as selected resources.

The query generation module 120 may also be configured to receive a plurality of inputs from the user based on which the report is to be generated. In an implementation, the user may provide a name for the report, select attributes of the resources for report generation, and select filters to be associated with the report. In another implementation, the user may define various operations to be carried out on the report, such as determination of summary and conditional aggregates. Further, the report generation system 102 may facilitate the user to define a structure of the report, such as a pivot report, a drill down report, a report with charts, or a combination thereof. Accordingly, various inputs provided by the user related to generation of the report may be stored as the other data 134.

The query generation module 120 may facilitate selection of related resources that may be joined with the selected resources. Once the related resources are identified, the query generation module 120 may create a query for retrieving various attributes of the selected resources at different instances. The query generation module 120 may be configured to store the attributes of the selected resources as attributes data 128. In an implementation, the query may be generated by the query generation module 120 by automatically creating a left outer join between the selected resources. The left outer join may be referred as a join operation that may allow the user to specify a join clause. Based on the join clause, unmatched rows from a left table may be preserved, joining them with a NULL row in the shape of a second (right) table.

For instance, if a report needs to be generated on a resource, such as an employee of an organization, the report may include details, such as an employee name, the organization for which the employee works, a watch owned by the employee, and a manufacturer of the watch. In accordance with the present subject matter, the query generation module 120 may facilitate the user to select the employee as the resource as well as the resources related to the employee. In other words, the user may select various resources that the employee may be related, such as the organization and the watch, for retrieving information therefrom. In another implementation, the query generation module 120 may automatically perform a look up on various resources associated with the employee.

Further, the watch may look up on the manufacturer of the watch. Once the resources are selected, the query generation module 120 may enable retrieval of attributes along with information, such as a join condition that influences the selection of a particular resource/attribute. An output of the above example may be retrieved along with the attributes of the resource as seen in table 1. Table 1 may be referred as an attribute table. The attribute table illustrates the attributes as displayable columns in the report.

TABLE 1

| Attribute name | Attribute of resource | Attribute Type | Join type | Joined with resource |
|---|---|---|---|---|
| Employee name | Employee | String | — | — |
| Contractor/Permanent | Employee | String | — | — |
| Organization name | Organization | String | Looked up by | Employee |
| Organization type | Organization | String | Looked up by | Employee |
| Watch name | Watch | String | Looks up on | Employee |
| Manufacturer | Manufacture name | String | Looked up by | Watch |

The report generation system 102 may further enable the user to build a customized report by selecting one or more parameters and operators, but without writing any query. For example, as mentioned above, the query generation module 120 may enable the user to select at least one operator, such as a Boolean operator, a run-time parameter and the like to be associated with the report. In an implementation, the at least one operator and the run-time parameter may be associated as a filter with the report. Accordingly, based on the user's selection, the query generation module 120 may automatically generate queries to be executed on the report. For example, if the user selects a run-time parameter, the query generation module 120 may generate a query related to the run-time parameter to obtain a list of values at run-time for a group in which the user is currently logged into. In said example, if organization type of the attribute table is made as a run-time parameter, the query provided by the query generation module 120 may be as follows:

"select column0 from resource_data where groupName=${group-id-in-user-logged-in-session} and resource_type=Organization"

where, column0 may be a column name in the attribute table where the attribute data may be stored. Further, group-id-in-user-logged-in-session may obtain a current group in which the user may be logged into when the report may be generated. This may enable data security even at the parameter level.

In an implementation, the query generation module 120 may generate a first query based on the at least one identified attribute. The first query may include instructions configured to be performed on one or more data sets, each of the data sets may be located within the database 108. In said implementation, the first query may be a structured query language (SQL) query. The present subject matter may facilitate dynamic generation of the first query when the user selects the one or more attributes associated with the resources of the metadata driven framework.

Accordingly, the first query may be based on multiple attribute tables and will be described in later paragraphs. The first query may be stored in a table schema, such as a reports table of the metadata driven framework. The table schema may be stored within the report generation system 102 as data sets 130. Although the table schema is shown internal to the report generating system 102, it may be understood that the table schema can reside in an external repository. The table schema may be configured to store information associated with various fields, such as a unique ID of the user device 104 selecting the resource, time at which any of the information was modified, queries, details about the selected attributes, and triggers. Table 2 illustrates a sample table schema with information stored in various columns and rows by way of example and not as a limitation. It will be understood that the type and amount of information stored in the table schema may be modified based on, for example, the dataset being used and the report being generated.

ger as soon as the first query gets stored therein. As mentioned above, the first query may be based on a plurality of attribute tables and therefore will be executed on a data set having a plurality of attribute tables for a plurality of resources. The database 108 may include a data set that may include the plurality of attribute tables, which in turn may include attributes of the resources associated with the metadata driven framework. A table or a data set containing the plurality of attribute tables of the resources may be referred as a source data set. For example, the source data set may be a resource data table that may include information about different attributes of various resources at different instances.

The first trigger may provide a materialized view as an output of the first query. It will be understood that the materialized view may refer to a database object, such as a summary table, that may include results of the first query. For example, the materialized view may include attributes and other data about a resource that may be stored in the source data set and queried by the first query. In the present implementation, the source data set may be associated with a second trigger when the materialized view is generated. As mentioned above, the second trigger may be understood as a procedural code that is automatically executed in response to certain events on a particular table or view in a database. In the present implementation, the second trigger may be configured to identify any changes, such as modifications, deletions, and additions in the source data set. In case any change is identified by the second trigger, the second trigger may automatically update the materialized view data.

Considering an example of a help-desk system that may have a repository. The repository may include a first resource

TABLE 2

| Name | Data Type | Not Null? | Primary Key? | Default | Comments |
|---|---|---|---|---|---|
| id | bigint | Yes | Yes | — | Unique ID |
| last_modified_on | timestamp without time zone | No | No | — | Last modified time |
| acms_procedure_query | text | No | No | — | Stores the view details if a materialized view is created for the report |
| snapshot_query | text | Yes | No | — | Stores the query if the report is snapshot |
| functional_query | character varying (1024) | No | No | — | Summary attribute (sum, avg, min, max) and the attributes for which a summary needs to be found are present in this field |

The table schema may include columns, such as name of the information (an id, a query, a trigger), type of the information (text, integer), whether or not the name is marked as a primary key, value of the primary key, any default value provided to the information, and description about the information. In an implementation, the table schema may be associated with a first trigger. A trigger may be understood as a program code that is automatically executed in response to occurrence of certain events on a particular data set, such as the table schema in the database.

According to an implementation, the analysis module 122 of the report generation system 102 may be configured to parse through the queries generated by the query generation module 120. When the first query is created, the analysis module 122 may determine if the first query has been stored in the table schema or not. Once it is determined that the first query has been stored in the table schema, the analysis module 122 may invoke the first trigger to execute the first query. In another implementation, the database invokes the first trigdata table for all INCIDENTS being recorded in the help-desk system. The first resource data table may include details, such as type of problem, date at which a ticket was raised, and whether the ticket is raised with a high priority or not. The repository may also include a second resource data table that may include details about various RESOLVER GROUPS involved with the help-desk system. The second resource data table may also include details, such as time taken to resolve the problem and a service level agreement (SLA) associated with the ticket.

In a scenario of the present example, a user may check number of incidents that were handled by a particular resolver group. The query generation module 120 may generate a query based on the user's selection performed through the user device 104. When the query gets recorded in the table schema, the analysis module 122 may invoke the first trigger to generate the materialized view as shown in table 3.

TABLE 3

| Incident Number | Description | Problem Type | Criticality | Created Date | Open Time | Closed Time | Priority |
|---|---|---|---|---|---|---|---|
| | | | | | | | |

In another implementation, upon execution of the first query, the analysis module 122 may insert the data into the snapshot table. The snapshot table may be understood as a cache table that may be configured to store the result of the first query. In said implementation, when a user executes a filter on the by using run time parameters, the analysis module 122 may execute the first query with the filters on the resource data table. Further, the analysis module 122 may store the result in the snapshot table along with the concatenated filter names and corresponding values. Furthermore, when the filter value is changed at run time while executing the report, a new row is inserted in the snapshot table with the filter name, values and the corresponding results.

Unlike the materialized view, the snapshot table may not get automatically updated, for example, by the second trigger, upon detecting any change in the source data set. Accordingly, to keep snapshot table data updated, the analysis module 122 may periodically check whether the snapshot table data is valid or not at the time of executing the report. The analysis module 122 may obtain the expiry time information from the report table associated with this snapshot table and may compare the expiry time against the current time. If the expiry time has passed, the information within the snapshot table is considered expired and re-inserted by executing the query stored in the snapshot query column of the report table.

Further, once the materialized view is generated, the materialized view may be configured to support a query rewrite function. The query rewrite function may transform a SQL query executed on the materialized view in terms of the source data set. For example, the SQL query may be transformed into a statement that may access the materialized view defined on the source data set. Accordingly, the query rewrite function may facilitate execution of the SQL query on the materialized view that is based on a source data set of the database 108. The report generation system 102 may therefore need not to execute the SQL query on the source data set itself every time. This may improve the execution of the SQL query as the SQL query is not being executed on the source data set. For example, if the user wants to find the number of incidents by tower and application, the query generated by the query generator module 120 for service management incidents may be, "select distinct application, month, count(incidents) as Incident Count, minimum sla, expected sla from trexreports.mtab where tower=$ {tower}"

In addition to selection of attributes that forms the first query, the user may define formulas that may be executed on each row of data, conditional counts also referred as aggregates on the result set returned by the second query. The second query, may be stored in the table schema as a flat query. For example, the table schema may include a snapshot query column for storing the flat query that needs to be executed on the materialized view. The instructions of the first query as well as the second query along with the storage location of the queries may be stored as the queries data 132.

According to an implementation, the rendering module 124 may configure the materialized view, such that it may be queried by the user devices 104 for generating report structures. The query in this case may be the second query, such as a formula. In an example, the user may execute a query for calculating conditional aggregates on the materialized view. As mentioned earlier, the materialized view may include a table where every attribute of the resource may be a column of the table. The analysis module 122 may therefore be configured to allow the user to run filters on the materialized view. The filters may be stored as expressions in one or more columns of the materialized view. For example, the filters may match a query, such as the second query submitted by the user through the user device 104, with the expressions. In case, the second query is targeted towards retrieving row level summary of the materialized view, the filters may match instructions of the second query with the expressions stored in a column to identify rows of interest.

Referring to the example of generation of materialized view for the help-desk system, as illustrated by table 3. The user may want to generate a report on the materialized view. For generating the report, a query needs to be executed on the materialized view. In an example, the user may select Incident Numbers, resolved tower, open time, closed time and actual time taken to close a ticket fields for generating the report. Accordingly, the query with the selected fields may be formed as a flat query on the materialized view. The query in this case may be as follows:

"select Incident Number, Resolved Tower, Open Time, Closed Time" provides the data from table 3.

In an implementation, the output of the above query may be a summary, such as a row level summary and is illustrated in table 4. On this resulting data, the analysis module 122 may perform the row level calculation using the Velocity template engine. The final rendered report may include the additional column 'Actual Time' as shown in Table 4. The row level summary may be retrieved from the materialized view (illustrated in Table 3 above) upon execution of the above query.

TABLE 4

| Incident Number | Tower | Open Time | Closed Time | Actual Time |
|---|---|---|---|---|
| | | | | |

Further, the rendering module 124 may be configured to read data from the materialized view and the row level summary, e.g., table 3 and table 4 respectively. The rendering module 124 may render the report in a format as specified by the second query submitted by the user. For example, the report may be in the form of a table, a pivot, a row level group, and the like.

The aforementioned features of the present subject matter are described with reference to the following examples. In an example, the user may define the Tower as a parameter on the materialized view. In an implementation, the analysis module 122 may analyze a processing time of a request in accordance with the tower parameter. Further, the user may specify the various priority types and problem types of the tickets for which the report needs to be generated.

Accordingly, the query generation module 120 may generate the second query based on the user's selection. Further, it will be understood that the analysis module 122 may execute the above query on the materialized view as depicted table 3. In the present example, the query may be as follows:

"select count(Incident Number), priority, problem type, resolver group from mtab where priority=? And problem type=?".

The '?' may be replaced with a particular priority or problem type. Based on the above query, the rendering module 124 may retrieve the count of incidents recorded in the helpdesk for a specific priority and problem type. Further, the user may want to retrieve the count of incidents by Tower. To do so, the query generation module 120 may generate the following queries on the basis of selection performed by the user device 104:

"Select count (incidents) from mtab where priority=?, problem type=?, Tower=?"

In the above query, the user may select the priority, problem type, resolver group, and tower parameter depending upon the users' requirement. Once, a materialized view containing the results of the above query are obtained, the user may select to generate an integrated report structure that may contain information collated from the above queries.

In another implementation, to obtain the count of incidents and the number of incidents that have met service level agreement (SLA), the user may need to run another query on the materialized view. The above query may provide the source data set as shown in table 5.

TABLE 5

| Problem Type | Tower | Criticality | Created Date | Priority | Total Incidents | No. of Incidents met SLA |
| --- | --- | --- | --- | --- | --- | --- |

In another example, the report generation system 102 may facilitate the user to retrieve aggregate data set based on some conditions, i.e., conditional aggregates. The conditional aggregates may be calculated using the velocity template engine. For example, the user may define a condition to determine the number of incidents logged for a particular period. In said example, the condition may include identifying the incident having criticality "Gold". In the present example, highly critical incidents may be categorized as "Gold", less critical incidents may be categorized as "Silver", and the least critical incidents may be marked as "Bronze". The criticality may, for example, be with respect to the duration for which the incident has not been resolved, SLA associated with the incidents, and the like. If the criticality of an incident is "Gold" and the incident SLA is met then the incident will be counted as "Number of Incidents for Gold". Alternatively, if the criticality of an incident is "Silver" and the incident SLA is met then the incident will be counted as "Number of Incidents for Silver". The conditional aggregates are calculated on the result set returned by second query using the velocity API. As mentioned above, the conditional aggregates are aggregate data sets as represented in table 6.

TABLE 6

| Criticality | Created Date | Tower | Priority | Number of Incidents for Gold | Number of Incidents for Silver |
| --- | --- | --- | --- | --- | --- |
| Gold | ### | A | High | 18 | 23 |
| Silver | 1#### | B | Medium | 12 | 14 |
| Bronze | ##### | A | Low | 14 | 5 |

Considering another example, the user may run filters on the materialized view (table 3). For example, a user may create a report that may include all incidents by criticality. Further, the user may add a condition, such as the user may define priority as 'HIGH'. Accordingly, the above query may retrieve the results. The query for the above condition may be made as follows:

"Select count (Incident Number), priority, criticality, tower from
mtab group by tower, priority
Loop
    Select count (Incident Number), tower from mtab where
criticality!= rec.criticality and Priority= rec.priority
End"

As described earlier, when the above query may be executed on the materialized view (table 3), the report may be generated as shown in table 7.

TABLE 7

| Priority | count(Incident Number) | Tower | Criticality | sla-met | Sla not met |
| --- | --- | --- | --- | --- | --- |
| High | 5 | A | Gold | 45 | 19 |
| High | 19 | A | Silver | 22 | 5 |

In an implementation of the present subject matter, various queries that may be executed on the materialized view may be stored in the table schema as flat queries. As mentioned above, the first trigger gets invoked to generate the materialized view.

In an implementation, the rendering module 124 may facilitate creation of multi-level pivot reports on the materialized view (as indicated in table 3). For example, the user may want to create a pivot report on a materialized view generated on data sets of a help desk system. The rendering module 124 may enable the user to configure the pivot report such that the pivot report provides data from the materialized view that is pivoted by the date earlier in the pivot report than the priority of the data. To generate the above defined pivot report, a query may be generated by the report generation system 102. As described earlier the query may be considered as the second query that may be executed on the materialized view.

The rendering module 124 may be configured to read data from the materialized view based on the user's query. As mentioned earlier, the report generation system 102 may facilitate the user to specify the type of the report that needs to be generated from the source data set. Accordingly, the rendering module 124 may format the data from the materialized view based on the type, such as a table, a pivot, and a row level group, that may be specified by the user.

The rendering module 124 may also facilitate the user to select data from the materialized view. In addition, the user may execute data query with or without pagination along with parameters. In case, the user requires a paginated report, the user may specify the fetch size based on which the report may be paginated. Further, the rendering module 124 may facilitate the user to select data from the aggregate data set.

Figure 2A:
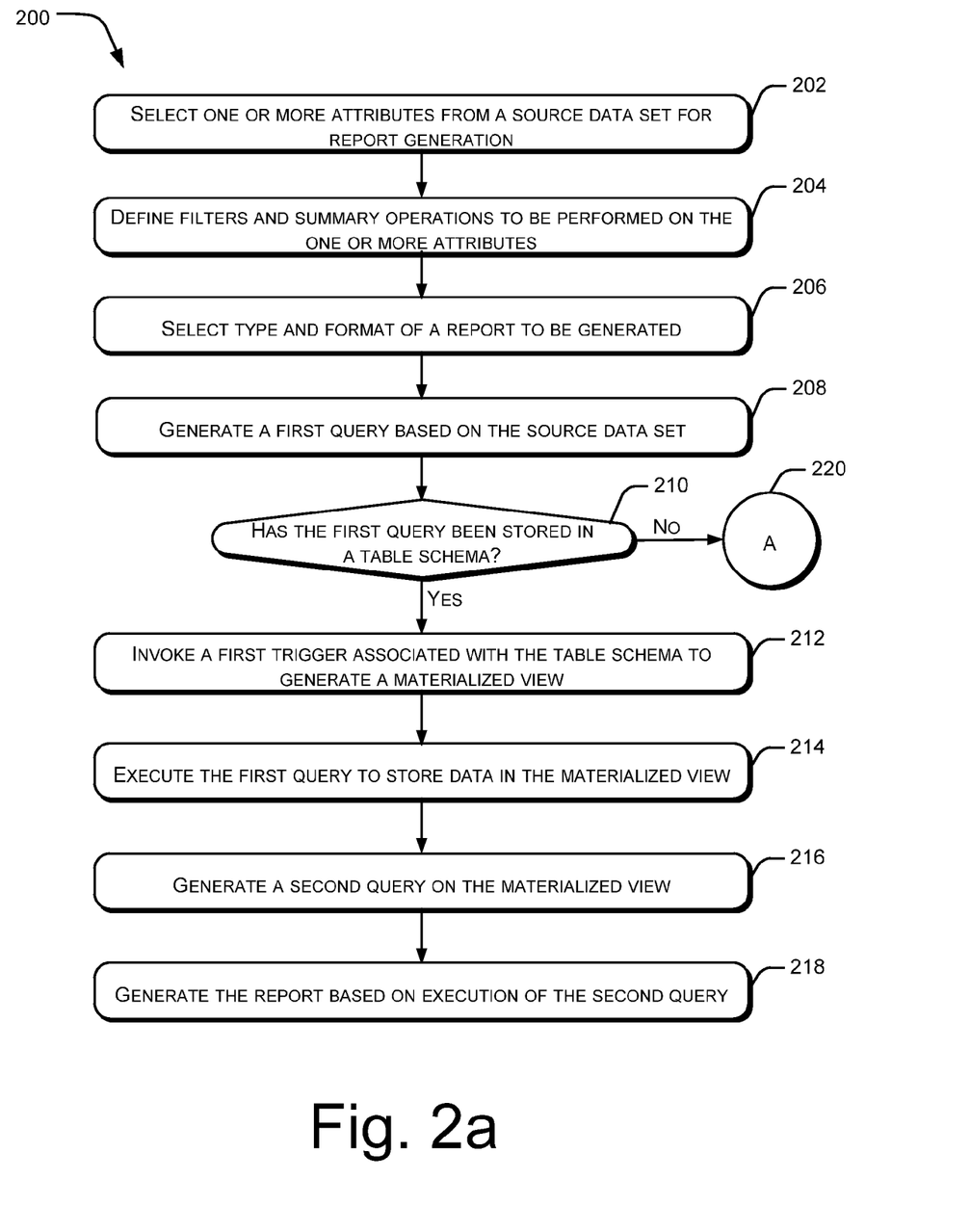
FIGS. 2a and 2b illustrate a flowchart of a method for generating a report, in accordance with an embodiment of the present subject matter.
Figure 2B:
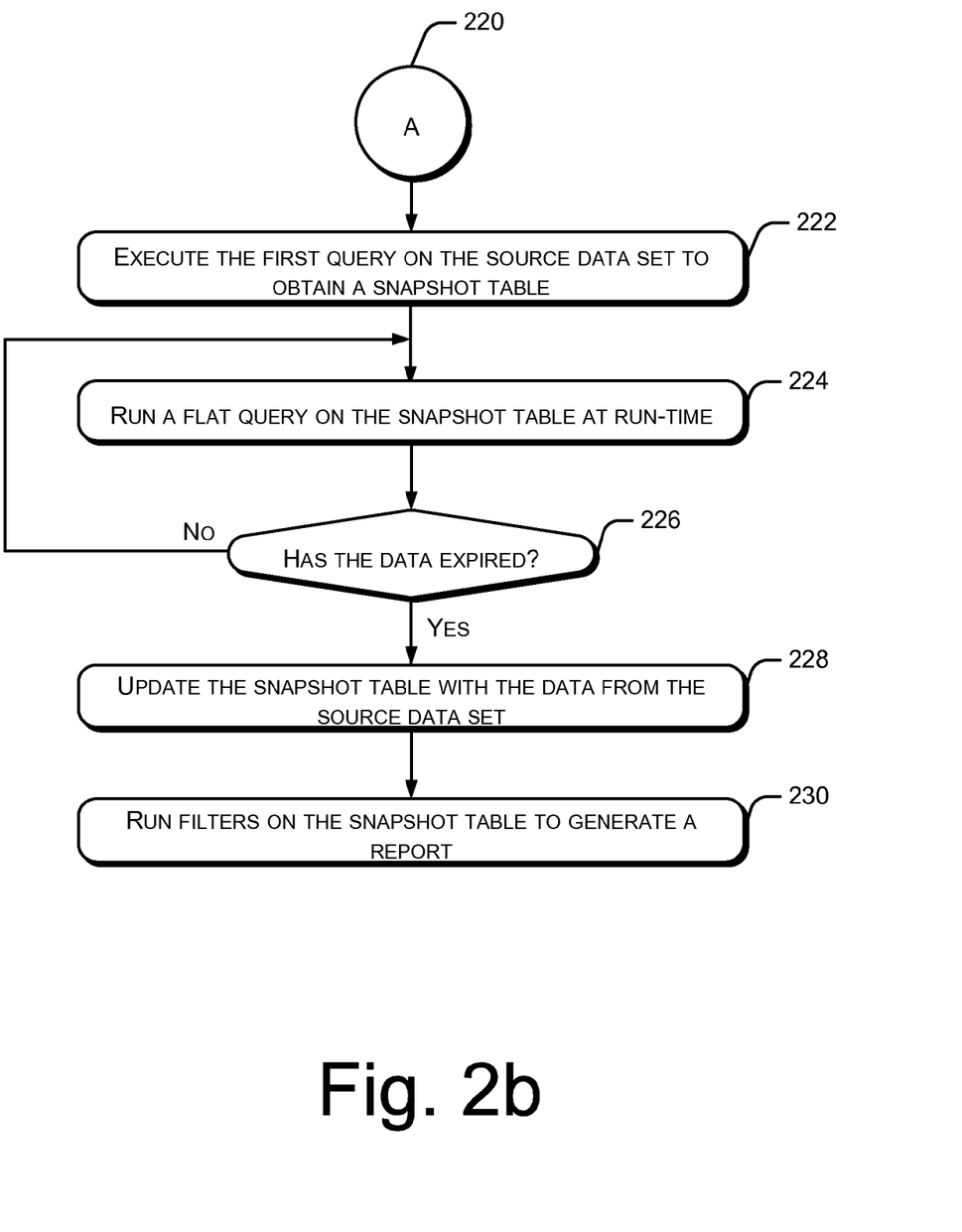

FIGS. 2a and 2b illustrate an exemplary method 200 of generating the report based on the materialized view, in accordance with an embodiment of the present subject matter. The method 200 may be described in the general context of computer executable instructions. Generally, computer executable instructions can include routines, programs, objects, components, data structures, procedures, modules, functions that perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

Referring to FIG. 2a, at block 202, one or more attributes from a source data set may be selected. It will be evident that the one or more attributes may be associated with the one or more resources of the metadata driven framework. The one or more resources may be selected by the user, such as through the user device 104. Further, the source data set may be configured to include information, such as attributes of various resources, join conditions between the one ore more resources, and other details.

At block 204, filters and summary operations to be performed on the one or more attributes may be defined. In an implementation, complex filter logics that may involve multiple AND/OR operations may be defined at block 204. Further, the summary operations may be defined that may include defining an aggregate function, grand total, a row level summary, and the like.

At block 206, a type of the report to be generated may be selected. The user may select a type of the report from the available options, such as pivot report, drill-down report, and chart based report. Further, the user may select a particular format of the report to be generated. It will be evident that the user may select the type and format of the report by the user device 104.

At block 208, a first query may be generated based on the source data set, for example, by the query generation module 120. It will be understood that the first query may be generated on the basis of the selection of the one or more resources from the source data set. As mentioned earlier, the first query may be configured to be executed on the source data set, such as a resource data table. In an implementation, the first query may be associated with various other queries that may be executed on a result of the first query. For example, the first query may include a row level summary and conditional counts defined therein.

At block 210, it is determined whether the first query is stored in a table schema or not, for example, by the analysis module 122. In an implementation, the table schema may be a reports data table that may be configured to store information, such as various queries being executed on the database 108, attributes data 128, number of records per page of the reports. The table schema may be associated with the first trigger.

Further, at block 212, if the first query has been stored, the first trigger may be invoked, for example, by the database 108, to generate a materialized view. It will be understood that the materialized view may be a summary table in which the results of a query may be stored. The materialized view may include information about attributes of a particular resource instance. The attributes of various resources associated with the metadata drive framework at various instances may be stored within the source data set.

In an implementation, the source data set may be associated with a second trigger. The second trigger may be configured to identify any changes taking place in the source data set. For example, if any row is added or deleted from the source data set, the second trigger may update the materialized view in accordance with the changes.

At block 214, the first query may be executed by the first trigger for inserting data inside the materialized view. The data inserted in the materialized view may be obtained as a result of execution of the first query.

The report generation system 102 may facilitate the user to define filters on the materialized view. Further, a flat query may be run on the materialized view. For example, the rendering module 124 may facilitate the user to run the flat query. In an implementation, the attributes of the resources may be used as filters and may be defined by the user.

At block 216, in accordance with an implementation of the present subject matter, a second query may be generated on the materialized view. As mentioned earlier, the materialized view may support a query rewrite function. This may facilitate the user to run the second query on the materialized view. Further, the second query may be generated based on a user selection of the materialized view data. For example, the user may define the second query to include pages in the report. It will be evident that the user may define the query by means of the user device 104.

Further, at block 218, the second query may be executed on the materialized view. Based on the execution of the second query, the report may be generated, for example, by the rendering module 124, for the user. For example, the report may include data divided into pages that may be defined in the query at block 216. It will be evident that the user may define queries on the materialized view for obtaining different formats of the report. As mentioned earlier, the table schema may be configured to store the second query.

Referring to FIG. 2b, the method 200 moves to block 220, when the first query is not stored in the table schema and may be executed on the source data set. Further at block 222, the first query may be executed on the source data set to generate a snapshot table. The snapshot table may be understood as a cache table that may include the results of the first query. In an example the analysis module 122 may be configured to execute the first query. As mentioned earlier, the materialized view may also include the results of the first query; however, the materialized view may be generated by invoking the first trigger. In present scenario, when the first trigger is not invoked, the analysis module 122 may anyhow execute the first query to generate the snapshot table.

At block 224, a run-time query may be executed on the snapshot table, for example, by the analysis module 122. It will be evident that the run-time query may be generated based on user selection.

At block 226, it is determined whether data in the snapshot table, such as snapshot table data has expired or not. If the snapshot table data has expired, the method 200 moves to block 228. If the data has not expired, the method 200 moves to block 224.

At block 228, updated data from the source data set may be retrieved. For example, if new columns have been added in the source data set, the rendering module 124 may provide the snapshot table with the updated data. It will be evident that the data in the snapshot table may not get automatically updated by the second trigger.

Thereafter, at block 230, filters may be run on the snapshot table. The report generation system 102 may facilitate the user to run the filters on the snapshot table. The filters may be executed by running queries on the snapshot table. The result of these queries may be considered as the report that may be generated from the snapshot table.

Accordingly, the present subject matter may facilitate generation of reports on the materialized view of the database containing metadata. The report generation system 102 may include executable instructions that may be designed to facilitate filtering of data, instructions for combining data from different data sources, instructions for updating join structures and relationships in report data, and instructions including logic to support a more complex internal data model.

The reports generated by the present subject matter may facilitate dynamically updating the reports when any change is detected in the source data set. As mentioned earlier, the second trigger may update the materialized view with respect to the source data set. The triggers, namely the first trigger and the second trigger may facilitate in reducing manual intervention by the user. In addition, the present subject matter may facilitate the user to select a format for the reports, such as a pivot report and a drill down report. Further, the user may also select to define a filter, a chart, a formula, and the like on the reports.

Although embodiments for report generation based on a materialized view have been described in language specific to structural features and/or methods, it is to be understood that the present subject matter is not necessarily limited to the specific features or methods described. Rather, the specific features and methods are disclosed as exemplary implementations for the report generation system.

We claim:

1. A computer implemented method for generating a report for a resource, the report being generated from databases comprising data sets related to a plurality of resources, the method comprising:
    dynamically generating, by a processor, a first query upon selection of at least one attribute by a user from a plurality of attributes, wherein the first query comprises instructions for being performed on the data set, wherein the plurality of attributes correspond to a particular instance of the resource, wherein the plurality of attributes of a plurality of resources is stored in a source data set;
    determining, by the processor, whether the first query is stored in a table schema, wherein the table schema is associated with a first trigger;
    invoking, by the processor, the first trigger when the first query is stored in the table schema, wherein the first trigger is configured to execute the first query to generate a materialized view upon execution of the first query, wherein the materialized view is a database object that contains results of the first query;
    generating, by the processor, a second query on the materialized view, based on user selection of the result of the first query rendered in the materialized view;
    dynamically generating, by the processor, the report by executing the second query on the materialized view, wherein the second query is generated based on materialized view data, and wherein the report comprises relevant data and corresponding updated data from the source data set, and wherein the source data set is associated with a second trigger to dynamically update the materialized view data when a change is recorded in the source data set; and
    generating a snapshot table based on the execution of the first query when the first query is not stored in the table schema in order to generate the report, wherein the snapshot table is configured to store the output of the first query.

2. The computer-implemented method as claimed in claim 1, wherein the generating the first query further comprises defining structure of the report based on user inputs.

3. The computer-implemented method claimed in claim 1, wherein the snapshot table is updated periodically to synchronize with a source data set when snapshot table data expires.

4. A report generation system for generating a report for a resource, the report being generated from databases comprising data sets related to a plurality of resources, the report generation system comprising:
    a processor; and
    a memory coupled to the processor, the memory comprising:
    a query generation module configured to,
        identify at least one attribute selected from a plurality of attributes of a resource, wherein the plurality of attributes correspond to a particular instance of the resource, and wherein the plurality of attributes of a plurality of resources is stored in a source data set; and
        dynamically generate a first query upon selection of at least one attribute by the user, wherein the first query comprises instructions for being performed on the data sets;
    an analysis module configured to,
        determine whether the first query is stored in a table schema, wherein the table schema is indicative of reports tables of databases, and wherein the table schema is associated with a first trigger;
        invoke the first trigger when the first query is stored in the table schema to execute the first query to generate a materialized view, wherein the materialized view is a database object that contains results of the first query; and
        provide a materialized view based on output of the first query wherein, the materialized view is a database object that contains result of the first query; and
    a rendering module configured to,
        generate a second query on the materialized view, based on user selection of the result of the first query rendered in the materialized view;
        dynamically generate a report by executing the second query on the materialized view, wherein the second query is generated based on materialized view data and wherein the report comprises relevant data and corresponding updated data from the source data set, and wherein the source data set is associated with a second trigger when the materialized view is generated, the second trigger is configured to update the materialized view data when a change is recorded in the source data set; and
    wherein the analysis module is further configured to generate a snapshot table based on the execution of the first query when the first query is not stored in the table schema in order to generate the report, wherein the snapshot table stores the output of the first query.

5. The report generation system as claimed in claim 4, wherein the query generation module is further configured to define filters and summary operations to be performed on the report that is generated based on the at least one attribute selected from a plurality of attributes.

6. The report generation system as claimed in claim 4, wherein the query generation module is further configured to define structure of the report based on user inputs.

7. The report generation system as claimed in claim 4, wherein the snapshot table is updated periodically to synchronize with the source data set when snapshot table data expires.

8. The report generation system as claimed in claim 4, wherein the second query is stored in the table schema as a flat query.

9. A non-transitory computer-readable medium having embodied thereon a computer program for executing a method for generating a report for a resource, the report being generated from database, comprising data sets related to a plurality of resources, the method comprising:

dynamically, generating, by a processor, a first query based on selection by a user, of at least one attribute from a plurality of attributes of a resource, the first query comprises instructions for being performed on one or more data sets, wherein each of the one or more data sets is located in databases, wherein the plurality of attributes of a plurality of resources is stored in a source data set;

determining, by the processor, whether the first query is stored in a table schema, the table schema being indicative of reports tables of the databases, wherein the table schema is associated with a first trigger;

invoking, by the processor, the first trigger when the first query is stored in the table schema, wherein the first trigger is configured to execute the first query to generate a materialized view upon execution of the first query, wherein the materialized view is a database object that contains result of the first query;

generating, by the processor, a second query on the materialized view, based on user selection of the result of the first query rendered in the materialized view;

dynamically generating, by the processor, the report by executing the second query on the materialized view, wherein the second query is created based on materialized view data and wherein the report comprises relevant data and corresponding updated data from the source data set, and wherein the source data set is associated with a second trigger to dynamically update the materialized view data when a change is recorded in the source data set; and generating a snapshot table based on the execution of the first query when the first query is not stored in the table schema in order to generate the report, wherein the snapshot table is configured to store the output of the first query.

10. The non-transitory computer-readable medium as claimed in claim 9, wherein the generating the first query further comprises defining structure of the report based on user inputs.

11. The non-transitory computer-readable medium as claimed in claim 9, wherein the snapshot table is updated periodically to synchronize with a source data set when snapshot table data expires.

* * * * *